United States Patent
Regone et al.

(10) Patent No.: US 7,391,673 B2
(45) Date of Patent: Jun. 24, 2008

(54) METHOD OF WIDE AZIMUTH SEISMIC ACQUISITION

(75) Inventors: Carl Regone, Katy, TX (US); Scott T. Michell, Houston, TX (US); John T. Etgen, Houston, TX (US); Ian Threadgold, Houston, TX (US)

(73) Assignee: BP Corporation North America Inc., Warrenville, IL (US)

( * ) Notice: Subject to any disclaimer, the term of this patent is extended or adjusted under 35 U.S.C. 154(b) by 0 days.

(21) Appl. No.: 11/609,716

(22) Filed: Dec. 12, 2006

(65) Prior Publication Data

US 2007/0159921 A1 Jul. 12, 2007

Related U.S. Application Data

(60) Provisional application No. 60/749,681, filed on Dec. 12, 2005.

(51) Int. Cl.
*G01V 1/00* (2006.01)
*G01V 1/38* (2006.01)
(52) U.S. Cl. .................................... 367/16; 367/56
(58) Field of Classification Search ............. 367/16, 367/56
See application file for complete search history.

(56) References Cited

U.S. PATENT DOCUMENTS

| | | | | |
|---|---|---|---|---|
| 4,758,998 A | * | 7/1988 | Johnson et al. | 367/58 |
| 4,970,696 A | * | 11/1990 | Crews et al. | 367/15 |
| 5,430,689 A | * | 7/1995 | Rigsby et al. | 367/15 |
| 5,682,357 A | * | 10/1997 | Rigsby | 367/15 |
| 5,717,655 A | * | 2/1998 | Beasley | 367/53 |
| 6,178,381 B1 | | 1/2001 | Padhi et al. | |
| 6,590,831 B1 | * | 7/2003 | Bennett et al. | 367/16 |
| 2002/0057628 A1 | * | 5/2002 | Hardage et al. | 367/56 |
| 2003/0067842 A1 | | 4/2003 | Sukup et al. | |
| 2004/0013037 A1 | * | 1/2004 | Vaage | 367/21 |
| 2006/0247857 A1 | * | 11/2006 | Zeng et al. | 702/2 |
| 2007/0159921 A1 | * | 7/2007 | Regone et al. | 367/15 |

FOREIGN PATENT DOCUMENTS

| | | |
|---|---|---|
| GB | 2390902 | 1/2004 |
| WO | WO 98/19181 | 5/1998 |
| WO | WO 02/25315 A2 | 3/2002 |

OTHER PUBLICATIONS

Cordsen, Andreas, et al., Narrow-Versus Side-Azimuth Land 3D Seismic Surveys, Aug. 2002, pp. 764-770, Publisher: The Leading Edge, Published in: US.

(Continued)

*Primary Examiner*—Deandra M Hughes
(74) *Attorney, Agent, or Firm*—Terry L. Watt; James A. Gabala

(57) ABSTRACT

According to a preferred aspect of the instant invention, there is provided a system and method for acquiring seismic data in a marine environment, wherein at least two source vessels are used in conjunction with a recording vessel which tows a plurality of hydrophone cables. Preferably, the source vessels will be positioned along side of the towed streamer configuration and most preferably one source vessel will be located near the recording vessel and the other at the end of the streamer configuration, preferably along the same side of the streamer configuration as the lead source vessel.

18 Claims, 6 Drawing Sheets

OTHER PUBLICATIONS

Padhi, T., and T.K. Holley, Wide Azimuths—Why Not?, Feb. 1997, Publisher: The Leading Edge, Published in: US.

Sukup, Dwight V., Wide-Azimuth Marine Acquisition by the Helix Method, Aug. 2002, pp. 791-794, Publisher: The Leading Edge, Published in: US.

* cited by examiner

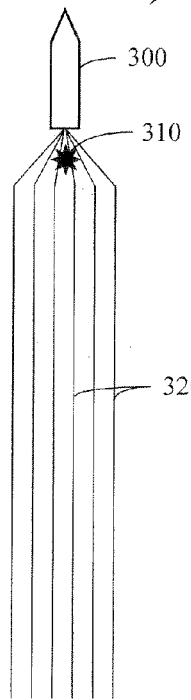
*Figure 3A (Prior Art)*
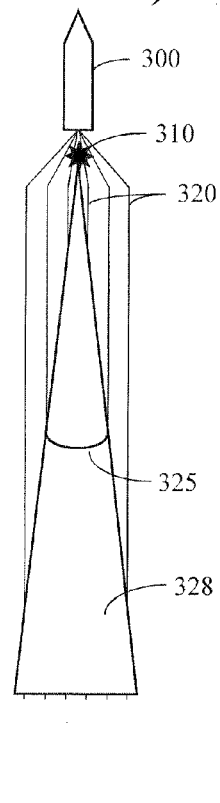
*Figure 3B (Prior Art)*
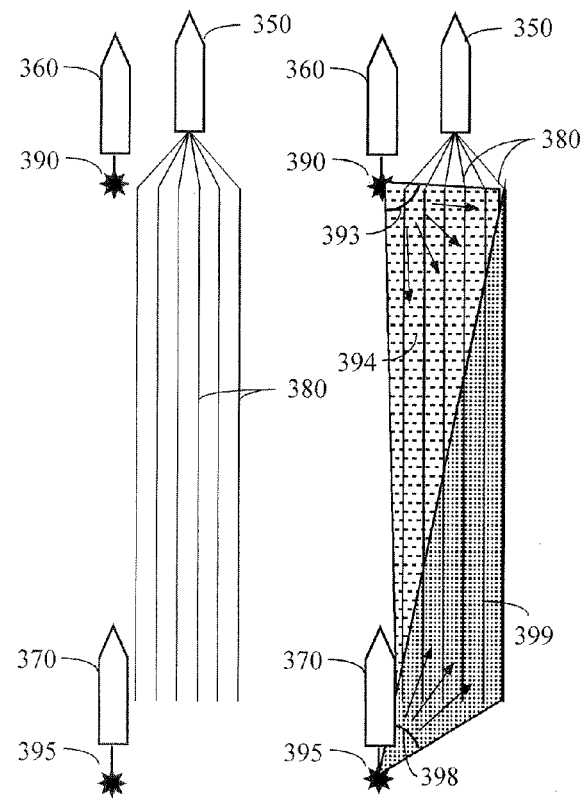
*Figure 5A*  *Figure 5B*
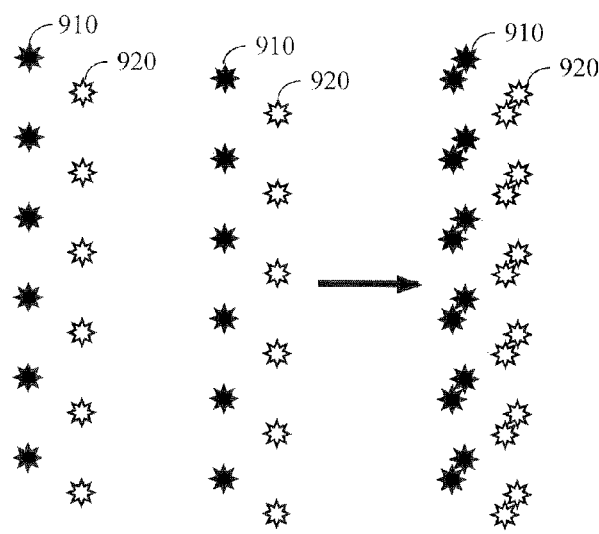
*Figure 9*
TILE 1   TILE 2   OVERLAY

"VIRTUAL" 32 CABLE SPREAD

*Figure 10A*     *Figure 10B*     *Figure 10C*
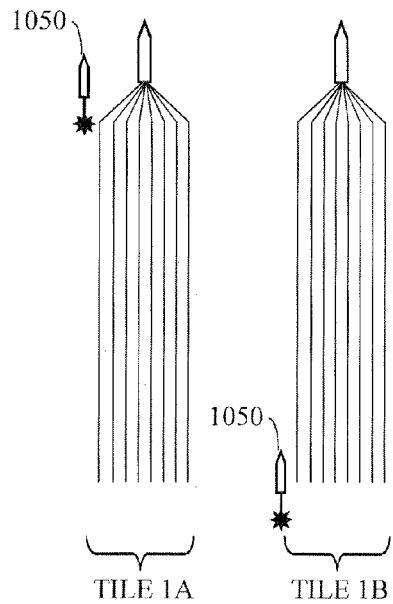
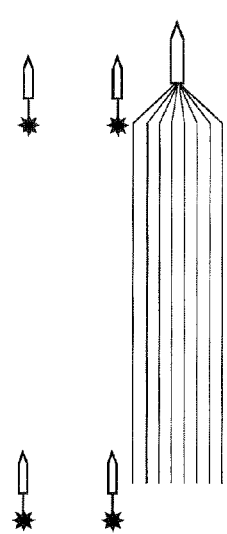
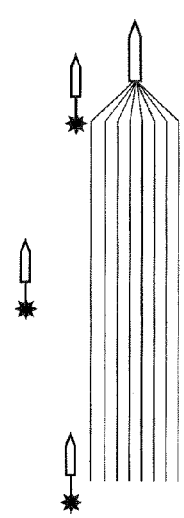
*Figure 10D*     *Figure 10E*     *Figure 10F*
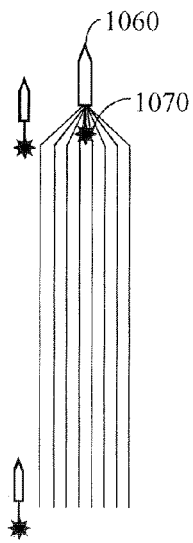
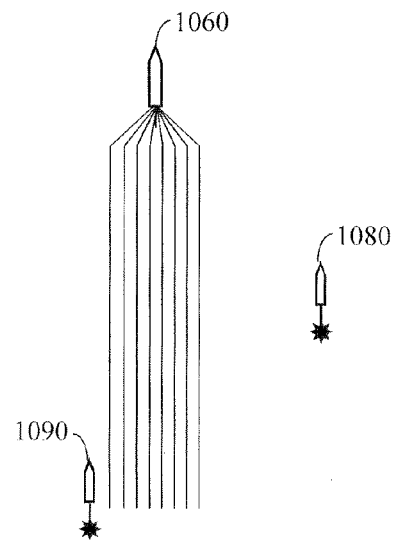
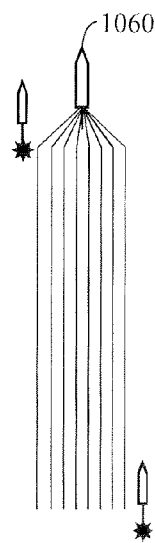

METHOD OF WIDE AZIMUTH SEISMIC ACQUISITION

CROSS REFERENCE TO RELATED CASES

This application claims the benefit of U.S. Provisional Patent Application Ser. No. 60/749,681 filed on Dec. 12, 2005 and incorporates said provisional application by reference into this disclosure as if fully set out at this point.

TECHNICAL FIELD

This invention relates to the general subject of seismic exploration and, in particular, to methods for quantifying and visualizing complex subsurface structures with seismic data.

BACKGROUND OF THE INVENTION

A seismic survey represents an attempt to image or map the subsurface of the earth by sending sound energy down into the ground and recording the "echoes" that return from the rock layers below. The source of the down-going sound energy might come, for example, from explosions or seismic vibrators on land, or air guns in marine environments. During a seismic survey, the energy source is placed at various locations near the surface of the earth above a geologic structure of interest. Each time the source is activated, it generates a seismic signal that travels downward through the earth, is reflected, and, upon its return, is recorded at a great many locations on the surface. Multiple source/recording combinations are then combined to create a near continuous profile of the subsurface that can extend for many miles. In a two-dimensional (2D) seismic survey, the recording locations are generally laid out along a single line, whereas in a three dimensional (3D) survey the recording locations are distributed across the surface, traditionally as a series of closely spaced adjacent two-dimensional (2D) lines. In simplest terms, a 2D seismic line can be thought of as giving a cross sectional picture (vertical slice) of the earth layers as they exist directly beneath the recording locations. A 3D survey produces a data "cube" or volume that is, at least conceptually, a 3D picture of the subsurface that lies beneath the survey area. In reality, though, both 2D and 3D surveys interrogate some volume of earth lying beneath the area covered by the survey.

A seismic survey is composed of a very large number of individual seismic recordings or traces. In a typical 2D survey, there will usually be several tens of thousands of traces, whereas in a 3D survey the number of individual traces may run into the multiple millions of traces. (Chapter 1, pages 9-89, of *Seismic Data Processing* by Ozdogan Yilmaz, Society of Exploration Geophysicists, 1987, contains general information relating to conventional 2D processing and that disclosure is incorporated herein by reference. General background information pertaining to 3D data acquisition and processing may be found in Chapter 6, pages 384-427, of Yilmaz, the disclosure of which is also incorporated herein by reference.

A seismic trace is a digital recording of the acoustic energy reflecting from inhomogeneities or discontinuities in the subsurface, a partial reflection occurring each time there is a change in the elastic properties of the subsurface materials. The digital samples are usually acquired at 0.002 second (2 millisecond or "ms") intervals, although 4 millisecond and 1 millisecond sampling intervals are also common. Each discrete sample in a conventional digital seismic trace is associated with a travel time, and in the case of reflected energy, a two-way travel time from the source to the reflector and back to the surface again, assuming, of course, that the source and receiver are both located on the surface. Many variations of the conventional source-receiver arrangement are used in practice, e.g. VSP (vertical seismic profiles) surveys, ocean bottom surveys, etc. Further, the surface location of every trace in a seismic survey is carefully tracked and is generally made a part of the trace itself (as part of the trace header information). This allows the seismic information contained within the traces to be later correlated with specific surface and subsurface locations, thereby providing a means for posting and contouring seismic data—and attributes extracted therefrom—on a map (i.e., "mapping").

The data in a 3D survey are amenable to viewing in a number of different ways. First, horizontal "constant time slices" may be taken extracted from a stacked or unstacked seismic volume by collecting all of the digital samples that occur at the same travel time. This operation results in a horizontal 2D plane of seismic data. By animating a series of 2D planes it is possible for the interpreter to pan through the volume, giving the impression that successive layers are being stripped away so that the information that lies underneath may be observed. Similarly, a vertical plane of seismic data may be taken at an arbitrary azimuth through the volume by collecting and displaying the seismic traces that lie along a particular line. This operation, in effect, extracts an individual 2D seismic line from within the 3D data volume.

Seismic data that have been properly acquired and processed can provide a wealth of information to the explorationist, one of the individuals within an oil company whose job it is to locate potential drilling sites. For example, a seismic profile gives the explorationist a broad view of the subsurface structure of the rock layers and often reveals important features associated with the entrapment and storage of hydrocarbons such as faults, folds, anticlines, unconformities, and sub-surface salt domes and reefs, among many others. During the computer processing of seismic data, estimates of subsurface rock velocities are routinely generated and near surface inhomogeneities are detected and displayed. In some cases, seismic data can be used to directly estimate rock porosity, water saturation, and hydrocarbon content. Less obviously, seismic waveform attributes such as phase, peak amplitude, peak-to-trough ratio, and a host of others, can often be empirically correlated with known hydrocarbon occurrences and that correlation applied to seismic data collected over new exploration targets.

However, for all of the advances that have been made in recent years in the technology of seismic processing, the resulting image of the subsurface is ultimately limited by the quality of the seismic data that is collected in the field. In more particular, and has been observed in a variety of different contexts, in order to accurately image complex subsurface structures the seismic data must be illuminated from a variety of different offsets and azimuths. So-called wide azimuth surveys have been done for many years on land and such surveys have proven in many cases to yield superior data that can be subsequently migrated or otherwise imaged to produce an improved picture of the subsurface as compared with traditional/narrow azimuth surveys.

Traditionally, marine seismic data are acquired via a towed streamer survey. As is generally indicated in FIGS. 3A and 3B, in a conventional arrangement a vessel tows several hydrophone cables behind it (i.e., several "streamers" in the argot of the trade) as it steams over a subsurface area of interest. Each streamer will typically contain several hundred hydrophones which are designed to sense seismic signals that have been reflected from subsurface rock formations and other density contrasts.

At periodic intervals, a seismic source (that is typically also towed by that vessel and located directly behind it) is activated. The source energy propagates downward through the water and penetrates into the ocean bottom, where it is ultimately encounters subsurface rock formations that reflect part of the down going energy back up toward the receivers. Recordings are made of the sensor responses for a short period of time after the source is activated (e.g. for 10 to 20 seconds) at a sample interval that is often either 2 ms or 4 ms For all of its usefulness, conventionally acquired marine seismic data have been shown to be a less than perfect means of exploring for hydrocarbon reserves when such are located beneath complex structures such as salt domes. Further, and this is especially true in the case of offshore prospects, the conventional means of collecting seismic data (e.g., via a marine survey) have heretofore been designed to acquire seismic data that sample the subsurface over only a limited range of azimuths (see, e.g., FIGS. 3A and 3B).

One important consequence of collecting data that illuminates the subsurface over a limited range of angles is that the resulting seismic volumes and sections will potentially be imperfect representations of the subsurface, and, thus, may cause false prospects to be drilled and/or promising targets to be missed.

Heretofore, as is well known in the seismic processing and seismic interpretation arts, there has been a need for a method of identifying and interpreting thin bed reflections. Accordingly, it should now be recognized, as was recognized by the present inventor, that there exists, and has existed for some time, a very real need for a method of seismic data processing that would address and solve the above-described problems.

Before proceeding to a description of the present invention, however, it should be noted and remembered that the description of the invention which follows, together with the accompanying drawings, should not be construed as limiting the invention to the examples (or preferred embodiments) shown and described. This is so because those skilled in the art to which the invention pertains will be able to devise other forms of this invention within the ambit of the appended claims.

SUMMARY OF THE INVENTION

According to a first preferred aspect of the instant invention, there is provided a system and method for acquiring seismic data in a marine environment, wherein at least two source vessels are used in conjunction with a single recording vessel that tows a plurality of hydrophone cables or streamers, each with a plurality of receivers, therebehind. Preferably, the source vessels will both be positioned along one of the long sides of the towed streamer configuration and, more preferably, one of the source vessels will be located near the recording vessel and the other at the opposite end of the streamers. The recording and source vessels will move in concert above a subsurface target of interest and, preferably, the source vessels will individually activate their seismic sources by alternating shots between the leading and trailing vessels. Signals from the source vessels will pass downward through the water and into the subsurface where they will be eventually be partially reflected back toward the surface at seismically reflective boundaries. The returning seismic energy will be recorded by the towed streamer for subsequent processing and imaging/interpretation of the subsurface beneath the survey.

In additional preferred embodiments, the three vessel combination will make multiple passes over the subsurface target of interest with the horizontal separation between the streamer configuration and the source vessels being different at each pass (e.g., the recording and source vessels will be moved farther apart). Preferably, the recording vessel will make four passes along the same track with the source vessels moving in parallel but farther away during each successive pass. If eight streamers are used and the spacing is chosen appropriately, a 32 streamer virtual survey may be assembled by combining recordings from the four different passes.

Preferably, eight streamers (each about 8 Km in length) will be towed by the recording vessel. Further, in the preferred configuration the lateral spacing between each cable will preferably be about 125 meters, although those of ordinary skill in the art will recognize that such survey parameters can (and are) routinely varied to suit the needs of the particular survey.

The foregoing has outlined in broad terms the more important features of the invention disclosed herein so that the detailed description that follows may be more clearly understood, and so that the contribution of the instant inventor to the art may be better appreciated. The instant invention is not to be limited in its application to the details of the construction and to the arrangements of the components set forth in the following description or illustrated in the drawings. Rather, the invention is capable of other embodiments and of being practiced and carried out in various other ways not specifically enumerated herein. Finally, it should be understood that the phraseology and terminology employed herein are for the purpose of description and should not be regarded as limiting, unless the specification specifically so limits the invention.

BRIEF DESCRIPTION OF THE DRAWINGS

Other objects and advantages of the invention will become apparent upon reading the following detailed description and upon reference to the drawings in which:

FIG. 3 contains a prior art method of shooting seismic data in a marine environment.

FIG. 5 contains a schematic illustration of a preferred source vessel/recording vessel configuration according to the instant invention.

FIG. 9 contains a schematic illustration of how navigation and shot timing problems can cause the shots taken in successive tiles to be mispositioned.

FIG. 10 illustrates some other preferred embodiments of the instant invention, more (or fewer) than two shooting vessels are used.

DETAILED DESCRIPTION

Figure 1:
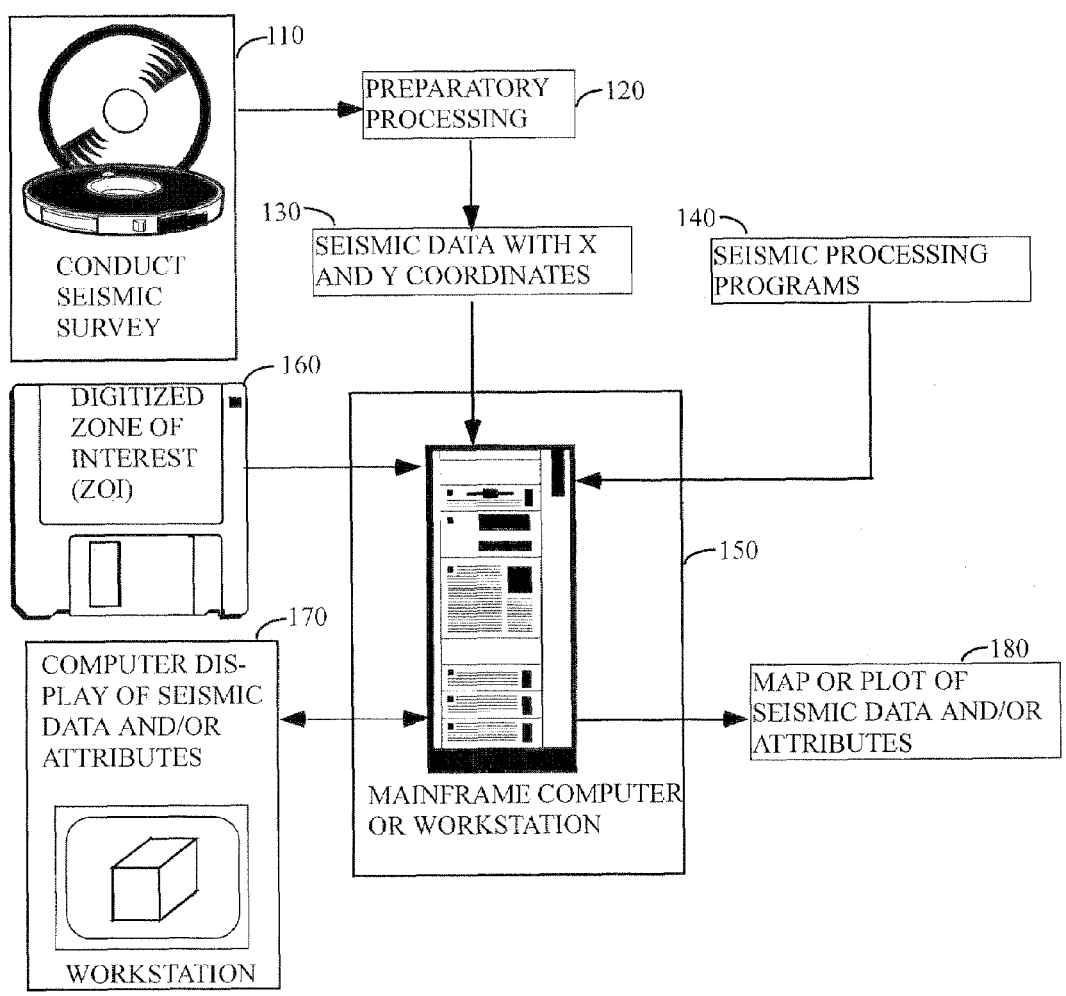
FIG. 1 illustrates a general environment of the instant invention.

While this invention is susceptible of embodiment in many different forms, there is shown in the drawings, and will herein be described hereinafter in detail, some specific embodiments of the instant invention. It should be understood, however, that the present disclosure is to be considered an exemplification of the principles of the invention and is not intended to limit the invention to the specific embodiments or algorithms so described.

GENERAL ENVIRONMENT OF THE INVENTION

FIG. 1 illustrates the general environment in which the instant invention would typically be used. Seismic data 110 are collected in the field over a subsurface target of potential economic importance and are typically sent thereafter to a processing center. Seismic surveys might be conducted on either land or water, but for purposes of the instant invention marine acquisition only will be considered. It should be noted that the instant invention would typically be utilized during step 110 of this figure.

In the field, each receiver (or receiver group) gives rise to one seismic trace each time the source is activated and the raw/unprocessed traces are typically written to a mass storage medium (e.g., magnetic tape, optical disk, etc.) for transmission to the processing center. In the processing center a variety of preparatory processes 120 are typically applied to the seismic traces to prepare them for a wide range of processing and imaging steps that conventionally follow. See, for example, steps 215 and 220 of FIG. 2 for some examples of these sorts of processes. The seismic traces (before, during, and after initial processing) might be stored, by way of example only, on hard disk, magnetic tape, magneto-optical disk, DVD disk, or other mass storage means. Note that it is conventional to associate each seismic trace with its position on the surface of the earth at the time the source was activated (step 130) and, by way of example only, this is often done during the preparatory processing step 120.

In the processing center, a variety of signal conditioning and/or imaging steps are typically performed. In the preferred arrangement, these steps will take the form of computer programs 140 that have been loaded onto a general purpose programmable computer 150 where they are accessible by a seismic interpreter or processor. Note that a general purpose computer 150 would typically include, in addition to mainframes and workstations, computers that provide for parallel and massively parallel computations, wherein the computational load is distributed between two or more processors.

As is further illustrated in FIG. 1, in the preferred arrangement some sort of digitized zone of interest model 160 is often specified by the user and provided as input to the processing computer programs. This zone of interest might correspond to a particular reflector or layer in the subsurface that is believed to trap or contain hydrocarbon resources. In the case of a 3D seismic section, the zone of interest 760 would typically include specifics as to the lateral extent and thickness (which might be variable and could be measured in time, depth, frequency, etc.) of a subsurface target. The exact means by which such zones are created, picked, digitized, stored, and later read during program execution is unimportant to the instant invention and those of ordinary skill in the art will recognize that this might be done any number of ways.

Figure 2:
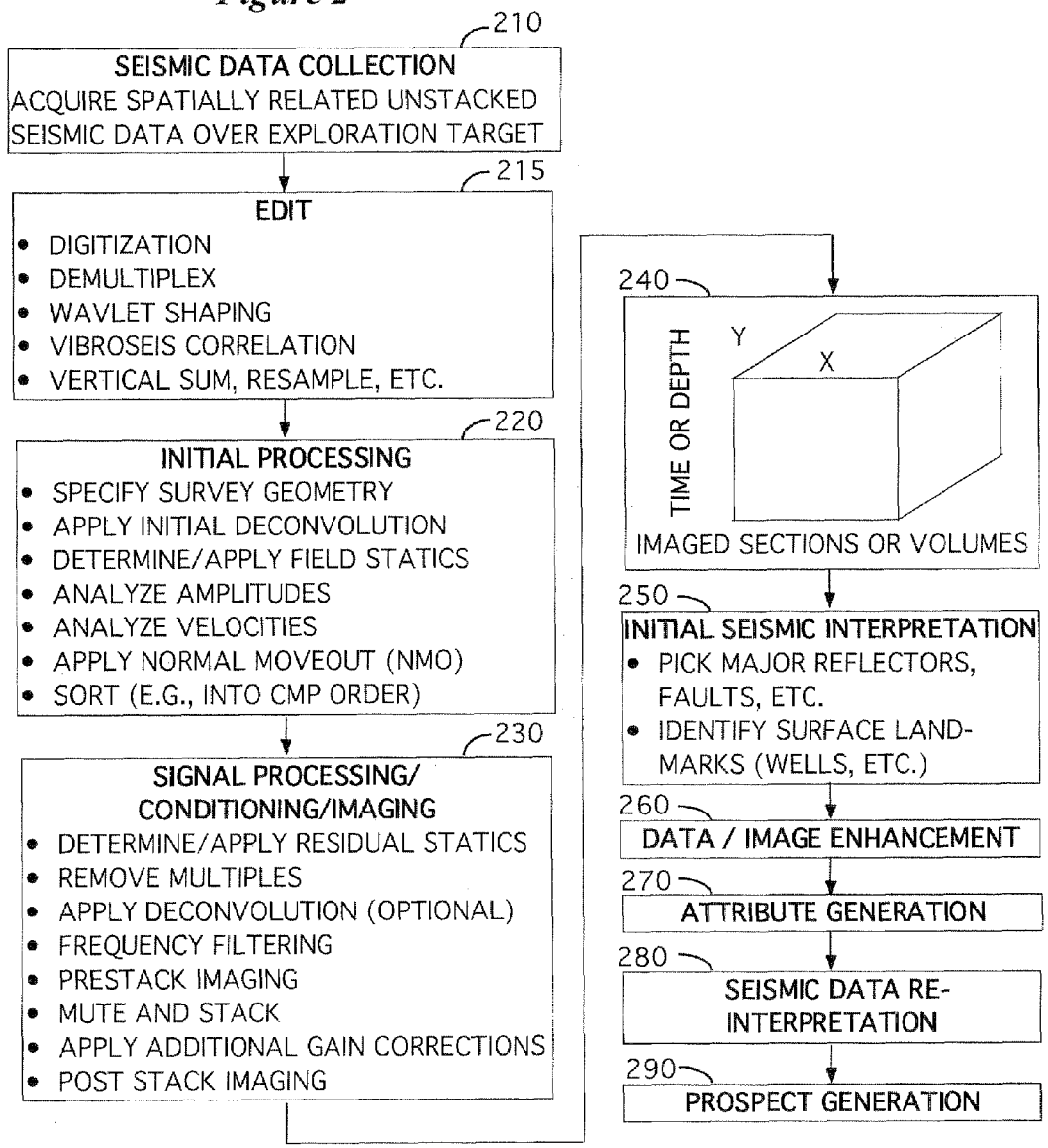
FIG. 2 contains a seismic processing sequence suitable for use with the instant invention.

Seismic processing programs 140 might be conveyed into the computer that is to execute them by means of, for example, a floppy disk, a magnetic disk, a magnetic tape, a magneto-optical disk, an optical disk, a CD-ROM, a DVD disk, a RAM card, flash RAM, a RAM card, a PROM chip, or loaded over a network. In a typical seismic processing environment, the various numerical treatments that are applied to the seismic data would be made part of a package of software modules that is designed to perform many of the processing steps listed in FIG. 2. Note that FIG. 2 is a generalized processing scheme that is suitable for use with land or marine data. Of course, since the preferred embodiment of the instant invention is marine in nature, those of ordinary skill in the art will understand that land data processing steps in FIG. 2 such as Vibroseiz® correlation, surface statics, etc., would not typically be applicable. Thus, the steps in FIG. 2 should be understood to be illustrative of a general processing scheme that would be suitable for either land or marine data, and not a processing scheme that would be utilized for every sort of data.

Returning to FIG. 1, the processed seismic traces would then typically be sorted into CMP gathers (3-D data will typically be binned), stacked, and displayed either at a high resolution color computer monitor 170 or in hard-copy form as a printed seismic section or a map 180. The seismic interpreter would then use the displayed images to assist him or her in identifying subsurface features conducive to the generation, migration, or accumulation of hydrocarbons.

As was indicated previously, seismic traces that have been acquired according to the instant invention will preferably be subjected to the seismic processing sequence that is generally indicated in FIG. 2. Those of ordinary skill in the art will recognize that the processing steps illustrated in FIG. 2 are only broadly representative of the sorts of processes that might be applied to such data and the choice and order of the processing steps, and the particular algorithms involved, may vary markedly depending on the individual seismic processor, the signal source (dynamite, vibrator, etc.), the survey location (land, sea, etc.) of the data, the company that processes the data, etc.

Turning now to FIG. 2, wherein some preferred seismic processing steps are illustrated, as an initial step a 2D or 3D seismic survey is conducted according to the instant invention over a particular volume of the earth's subsurface (step 210). The data collected in the field consist of unstacked (i.e., unsummed) seismic traces which contain digital information representative of the volume of the earth lying beneath the survey. Preferably the data will be have been collected according to the instant invention but the general processing scheme that follows would be applicable to data from a wide variety of sources.

A central goal of a seismic survey is to acquire a collection of spatially related seismic traces over a subsurface target of some potential economic importance. Seismic traces that are acquired by the methods taught herein might be utilized in the form of stacked or unstacked 2-D seismic lines, stacked or unstacked 3D seismic volumes, etc. The invention disclosed herein is most effective when used to acquire a 3-D seismic survey that has an underlying spatial relationship with respect to some subsurface geological feature.

After the seismic data are acquired (step 210), they are typically taken to a processing center where some initial or preparatory processing steps are applied to them. As is illustrated in FIG. 2, a common early step 215 is designed to edit the input seismic data in preparation for subsequent processing (e.g., demux, gain recovery, wavelet shaping, bad trace removal, etc.). This might be followed by specification of the geometry of the survey (step 220) and storing of a shot/receiver number and a surface location as part of each seismic trace header. Once the geometry has been specified, it is customary to perform a velocity analysis and apply an NMO (normal move out) correction to correct each trace in time to account for signal arrival time delays caused by offset between the source and receiver.

After the initial pre-stack processing is completed, it is customary to condition the seismic signal on the unstacked seismic traces before creating stacked (or summed) data volumes (step 230). In FIG. 2 step 230 contains a typical "Signal Processing/Conditioning/Imaging" processing sequence, but those skilled in the art will recognize that many alternative processes could be used in place of the ones listed in the figure. In any case, the ultimate goal from the standpoint of the explorationist is the production of a stacked seismic volume or, in the case of 2D data, a stacked seismic line for use in the exploration for hydrocarbons within the subsurface of the earth.

As is suggested in FIG. 2, any digital sample within a stacked seismic volume is uniquely identified by a (X, Y, TIME) triplet, with the X and Y coordinates representing some position on the surface of the earth, and the time coordinate measuring a recorded arrival time within the seismic trace (step 240). For purposes of specificity, it will be assumed that the X direction corresponds to the "in-line" direction, and the Y measurement corresponds to the "cross-line" direction, as the terms "in-line" and "cross-line" are generally understood in the art. Although time is a preferred and most common vertical axis unit, those skilled in the art understand that other units are certainly possible might include, for example, depth or frequency. Additionally, it is well known to those skilled in the art that it is possible to convert seismic traces from one axis unit (e.g., time) to another (e.g., depth) using standard mathematical conversion techniques.

The explorationist may do an initial interpretation 250 of the resulting stacked volume, wherein he or she locates and identifies the principal reflectors and faults wherever they occur in the data set. This might be followed by additional data enhancement 260 and/or attribute generation (step 270) of the stacked or unstacked seismic data. In many cases the explorationist will revisit his or her original interpretation in light of the additional information obtained from the data enhancement and attribute generation steps (step 280). As a final step, the explorationist will typically use information gleaned from the seismic data together with other sorts of data (magnetic surveys, gravity surveys, LANDSAT data, regional geological studies, well logs, well cores, etc.) to locate subsurface structural or stratigraphic features conducive to the generation, accumulation, or migration of hydrocarbons (i.e., prospect generation 290).

PREFERRED EMBODIMENTS

According to a first preferred embodiment and as is generally illustrated in FIGS. 5A and 5B, there is provided a method of seismic acquisition which is designed to produce a marine seismic data set, wherein the seismic traces are acquired at a wide range of different azimuths. As is indicated in these figures, in a preferred arrangement a receiver or recording vessel 350 will pull seismic streamers 380 as is conventionally done in a marine survey. Additionally, and according to a preferred aspect of the instant invention, separate source vessels 360 and 370 will steam alongside the towed streamers 380. When the sources 390 and 395 are individually activated, the seismic energy generated thereby will travel downward into the subsurface and, upon its return, it will encounter the towed streamer array 380 at different azimuths than would normally be the case with a conventional marine survey, thereby improving the imaging properties thereof.

By way of comparison, consider the conventional marine source/receiver configuration (prior art) as it is set out in FIGS. 3A and 3B. In a typical arrangement, a single recording vessel 300 tows a hydrophone streamer array 320 through the water along a predetermined course that lies above a subsurface target of interest. The prior art recording vessel 300 typically also tows a seismic source 310 in addition to the streamer array 320, the source 310 typically being an airgun or airgun array. Operationally, the source 310 is activated and, after a short period of time, the hydrophones in the streamer array 320 sense reflected seismic energy that has interrogated the rock units in the subsurface. As is indicated by the overlaid region 325, the returning seismic energy will tend to travel into the subsurface and back within a fairly narrow range of azimuthal angles 325 with respect to the source 310.

However, comparing FIG. 3B with FIG. 5B should make it clear one advantage of the instant inventive approach. That is, because that seismic sources of the instant invention originate from very different locations with respect to the receivers, seismic energy travels to the waiting receivers along a wide range of different paths/azimuths. By way of illustration compare a hypothetical range of travel paths as represented shaded regions 394 and 399 with the path that would be expected by using a single recording/source vessel 325. Said another way, according to the instant invention seismic energy from source vessels 360 and 370 reach the streamer array 380 from many different angles (393 and 398) depending on whether the lead 360 or the trailing 370 vessel is the source of the seismic signal. Thus, it should be clear that, in a preferred arrangement, seismic data will be collected from a much wider range of azimuths according to the data collection scheme of the instant invention, as compared with the prior art. Note that, preferably the sources 390 and 395 will be alternatively—not simultaneously—activated.

Of course, those of ordinary skill in the art will recognize the important of having a wide range of source-receiver azimuths in a seismic survey. Especially in regions of complex geology, it is all too likely that a conventional seismic survey will contain subsurface regions of poor target illumination. In a worst case scenario, the "holes" (or shadow areas, etc.) in the subsurface coverage can result in key structural features not being resolvable. Further, illumination irregularities can create artifacts in the processed data that that can degrade its overall quality and, in some instances, result in incorrect interpretations of the subsurface structure. Additionally, imaging algorithms such as 3D migration benefit where the data are collected over a wide range of azimuths. This is, of course, a central goal of the instant invention and use of the approach taught herein during seismic data collection will reduce the likelihood that the subsurface coverage will contain significant under imaged regions.

Figure 4:
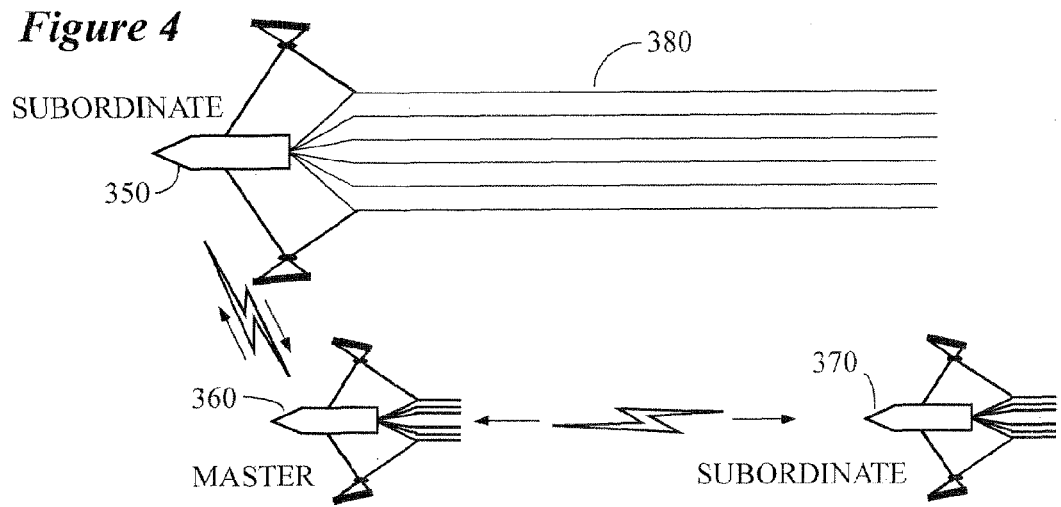
FIG. 4 illustrates a preferred master vessel—subordinate vessel shooting configuration suitable for use with the instant invention.

Turning next to FIG. 4, the general configuration of a preferred arrangement of the recording 350 and shooting vessels 360 and 370 is shown in greater detail. As is indicated in this figure, in a preferred arrangement, one of the separate source vessels 360, will be designated as a "master" vessel for the operation. The master vessel will control, preferably via telemetry, the timing of the shots and recording of seismic information in all three vessels as they move over the area of interest. In more particular, the master vessel 360 will preferably control when both of the source vessels 360 and 370 activate their respective source arrays and also will control when the recording vessel 350 begins to record information from the hydrophones in the streamers 380. Note that in some preferred embodiments, the vessel 350 that tows the receivers 350 might also be equipped with its own source as is conventionally done when a single-vessel survey is performed.

FIG. 5 contains another preferred aspect of the instant invention. As can be seen in that figure, in addition to the recording and source vessels discussed previously, it is anticipated that additional support vessels, including chase and supply vessels, might also be used depending on the type and geographical location of the survey.

Figure 6:
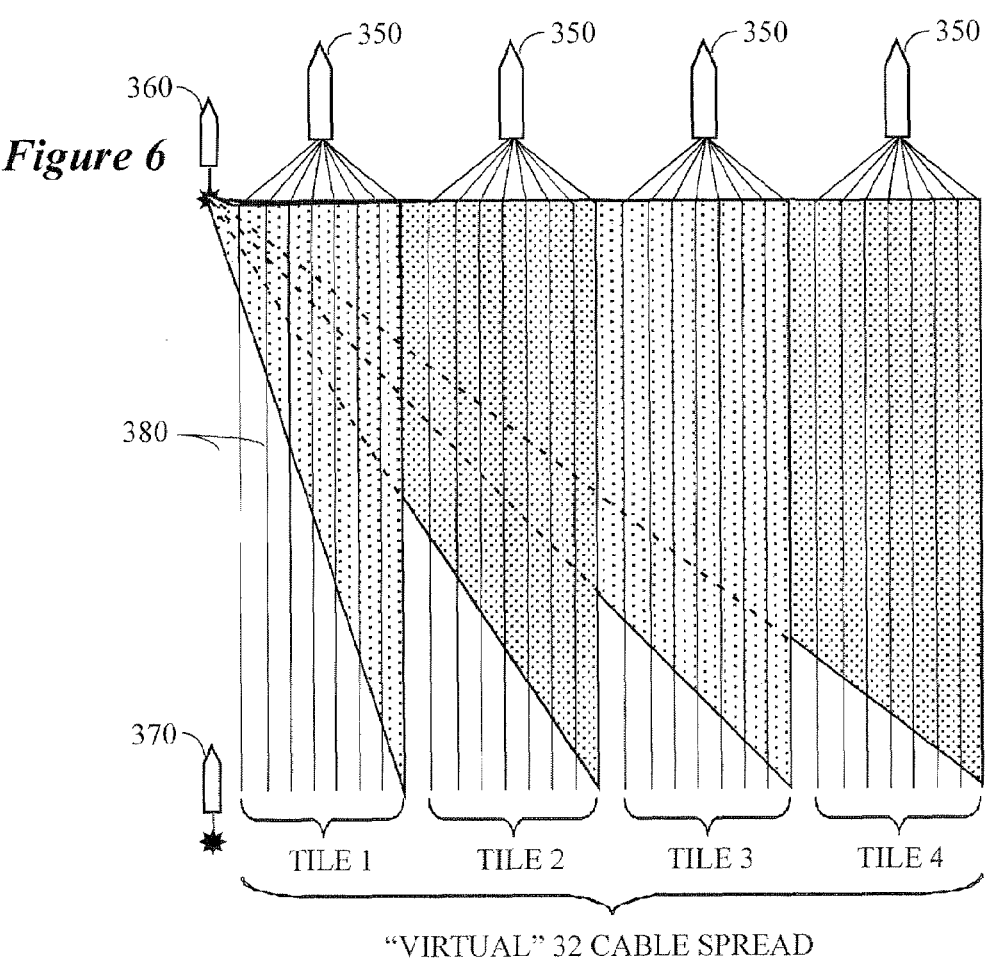
FIG. 6 illustrates in the general way the range of azimuths provided by four successive passes (tiles) over the same subsurface target, wherein the source-to-receiver distance is increased at each pass.
Figure 7:
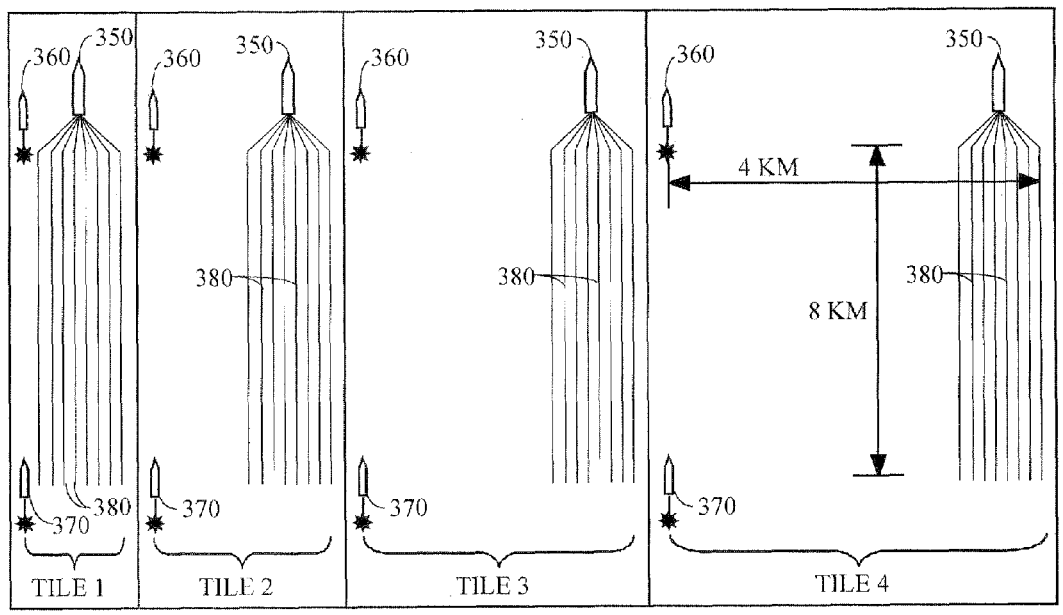
FIG. 7 comprises a schematic drawing that illustrates various source vessel/receiver vessel configurations as might be used during the acquisition of different tiles or during different passes.

As is generally indicated in FIG. 6, in the preferred embodiment, multiple passes of the sources 360/370 and/or receiver 350 vessels over the subsurface will be used. That is, and as is generally indicated in this figure, in one preferred embodiment the source vessels 360 and 370 will sail the same path multiple times (e.g., 4 times in FIG. 6), while in successive passes the recording vessel 350 will move further away from the source vessels, each offset between successive passes preferably being a constant value related to the width of the streamer 380. Note that the arrangement in FIG. 6 is actually a composite diagram that illustrates four different passes of the same three vessels, with the separation between the source vessels and the recording vessel being increased at each pass. Of course, whether that increase is obtained by moving the sources 390 and 395 further away from the recording vessel 350 as it sails along the same path or whether the shot to cable offset is modified by moving the recording vessel 350 with respect to the source vessels 360/370 is immaterial to the operation of the instant invention. FIG. 7 illustrates this same idea in greater detail for a series of four different "tiles" or passes, each tile representing a different data collection configuration wherein the offset between source and recording vessels is varied.

Figure 8:
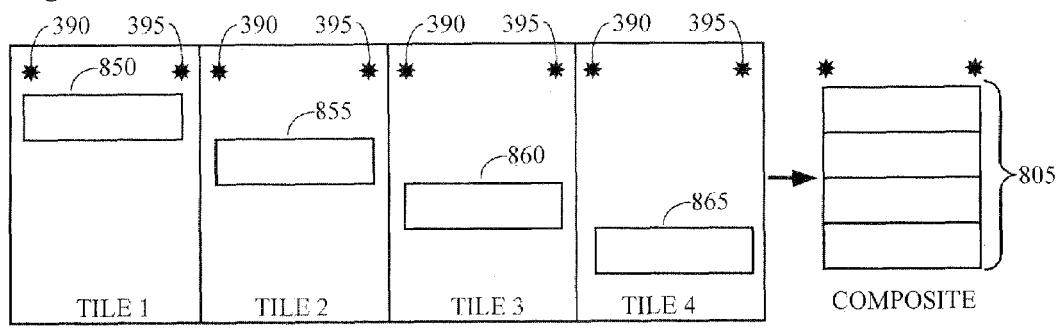
FIG. 8 illustrates in a schematic way how multiple receiver patches can be combined to create, in effect, a collection of traces that are as though they resulted from a single two-source seismic survey.

FIG. 8 contains a conceptual illustration of how an 8 streamer array that has been used in multiple passes of the source and recording vessels at different offsets can be combined into a single virtual array 805 that provides coverage that is similar to that which would have been obtained in one pass of a two source vessel/one recording vessel combination, wherein the recording vessel tows 32 hydrophone streamers. As this figure generally indicates, the different receiver patches 850-865 (i.e., recordings obtained in separate passes of the recording vessel above the target) may be assembled to create a composite patch of receivers 805 that covers an area four times as large as any single patch. Needless to say, this same approach could readily be adapted to a case where there were fewer (e.g., three or fewer) or more (e.g., five or more) passes.

As has been discussed previously, in a preferred arrangement two source vessels and one recording vessel will be used. A recording geometry suitable for use with the instant invention would be one where the recording vessel towed eight eight-kilometer geophone cables with 125 meter separation therebetween. In the preferred arrangement, four tiles or passes over each portion of the survey area will be utilized, with one kilometer lateral move-up on the cables. Preferably, a 250 meter lateral shot line move-up will be used within each tile.

As to the preferred shooting configuration, preferably the two source vessels will alternate shots, with each vessel firing its source about every 150 meters. Preferably, a 13 second recording length will be used at a sample rate of four milliseconds. The source will preferably be an omni directional source array and, preferably, the same source array will be utilized on both source vessels. Additionally, and preferably, dual arrays will be used on each vessel.

In the preferred arrangement, vessel navigation will be controlled using the same GPS system on all three vessels. An integrated navigation and control system will preferably be used that is designed to handle all three vessels. Of course, those of ordinary skill in the art will readily be able to assemble the positioning and communications systems necessary to produce such a coordination of movement and shooting.

Those of ordinary skill in the art will be very familiar with how to select the survey parameters that would be suitable for use with the instant invention. However, and only for purposes of illustrating a preferred embodiment of the instant invention, in practice in some preferred embodiments each 8 by 8100 meter receiver swath will be towed at a depth of 12-15 meters and shot with a 250 meters overlap in the cross-line direction until the full-fold survey area is covered, with the streamers preferably being separated by about 125 meters.

Further, and with respect to the sources, in some preferred surveys there will be two source arrays on each vessel.

Needless to say, accurate navigation during the shooting and collection of seismic data in successive passes of the target is important. In a perfect world, subsequent passes of the shot and receiver vessels will be precisely positioned so that data from different passes can be readily combined as though they were collected from a single shot into many (e.g., 32) different receiver arrays. Absent this sort of navigational and firing control, a situation similar to that illustrated in FIG. 9 can easily develop. This figure contains a schematic plan view illustration of shot locations from a leading vessel 910 which are alternated with shots from a trailing vessel 920 in two different passes or tiles. Although the leading 910 and trailing 920 shots would typically be in line with each other, in this example they have been offset slightly from each other to improve the legibility of this diagram. As can be seen, in this example the shots taken in the second pass ("TILE 2"), although not obviously offset from those of the first past ("TILE 1"), when overlain ("OVERLAY") with the first show a systematic bias (non-systematic errors are also possible) that will need to be accounted for during processing according to methods well known to those of ordinary skill in the art. Of course, it is very difficult (if not for all practical purposes impossible) to have the shot locations exactly coincide in subsequent passes. That being said, inaccuracies in the location of successive shots are not a serious detriment to the operation of the instant invention, but should be minimized to the extent possible.

After the data have been acquired according to the methods discussed herein, it is anticipated that they will be taken in digital form back to a processing center where various seismic processes of the sort generally indicated in FIG. 2 will be applied in preparation for using the data in the exploration for hydrocarbons and other subsurface deposits. For example, in some cases bad (noisy) traces will be physically edited out of the survey data but in other instances, it might be advisable to merely flag such noisy traces as dead and pass them onward through the processing sequence that will follow. Whether or not the data needs to be de-signatured is a design decision well within the ability of one of ordinary skill in the art to make. In some cases, the seismic data might be processed to have minimum phase or zero phase and, in some instances, de-ghosting might be applied. Finally, depending on the processing that is anticipated to follow, the initial trace sorting order might be based on virtual streamer number, virtual trace number, virtual source number, or any other similar parameter. Those of ordinary skill in the art will recognize that the foregoing lists only a few of the many possible preprocessing concerns that might need to be addressed depending on the nature of the data and its intended use.

A goal of the instant invention is, of course, to assemble a wide azimuth seismic dataset that is (at least in theory) equivalent to the dataset that would have been obtained by firing a single shot into a much larger receiver array (e.g., consider composite 805 in FIG. 8). Given seismic data that have been acquired and thereafter organized either logically (e.g., using values stored in each trace header) or physically (e.g., written together onto a storage medium) in this manner, the unstacked data might be viewed as part of the exploration process, e.g., unstacked gathers/bins might be displayed for purposes of identifying amplitude variations with offset ("AVO") effects, etc. Additionally, in many instances the data will be further processed, taking advantage of the wider range of azimuths than would otherwise be present, to produce enhanced images of the subsurface. In either case, data that have been collected according to the instant invention are well suited for use in the geophysical exploration for subsurface resources.

Although the instant invention has been generally pictured in terms of two shooting vessels positioned generally behind the vessel that tows the hydrophone streamers, wherein both are situated on the same side of the streamers, such is only the preferred configuration. For example, the instant inventors have determined that similar results could be obtained where the two shooting vessels are on opposite sides of the streamers (e.g., FIG. 10F).

Similarly, although it is preferred that two shooting vessels be used, it is also possible to obtain seismic data according to the instant invention through the use of a single source vessel, e.g., by making two passes per tile, with the shooting vessel 1050 being positioned alternately at the head of the receiver array one pass and at its tail the next. See, e.g., FIG. 10A wherein Tile 1A is collected during one pass and Tile 1B is collected using the same source vessel 1050 at the opposite end of the receiver array during a subsequent pass. In some instances, Tile 1B will be collected while the source and receiver vessels are sailing in a direction opposite from that utilized when Tile 1A was collected. Needless to say, good navigational control will be especially important when a single shooting vessel is used.

Indeed, although the use of two shooting vessels is preferred, in some instances it might be desirable to utilize three, four, or more shooting vessels. Consider, for example, the example of FIG. 10B, wherein two vessels at the head and two at the tail of the receiver array are utilized. In such an instance, effectively two different "tiles" could be acquired at each pass, assuming that the shot spacing and timing are properly specified. Obviously, this could be extended to any arbitrary number of shooting vessels.

In still another preferred embodiment, and as is generally indicated in FIG. 10C, three source vessels—one positioned at each end of the receiver array and another somewhere alongside—might also be utilized. Those of ordinary skill in the art will understand there are countless variations of this same scheme which might be implemented depending on the needs of the explorationist or the peculiarity of the subsurface in the survey area. Further, and as has been discussed previously, in any of the foregoing embodiments it might be desirable to have the receiver-towing vessel 1060 be equipped with its own source 1070 so that a conventional seismic dataset could be acquired in concert with the acquisition of the wide-azimuth dataset. The utility of having such a survey should be clear, e.g., it could be used to tie reflectors obtained via the instant method to reflectors observed in other/conventional surveys that have been recorded in the same area, it could be used in combination with the wide-azimuth datasets for seismic attribute purposes, etc.

According to still another preferred embodiment, in some instances, it might be advantageous to have the source vessels remain substantially in place while the recording vessel pulls the streamers in their vicinity, rather than have the three vessels move in parallel over the entire survey area. In practice this might mean having the source vessels move in a relatively small diameter circular path while the recording vessel traces a larger path around them. Of course, and as has been described previously, by varying the distance between the shot and recording vessels a survey that includes a wide range of azimuthal angles can be collected.

Finally, although many variations with respect to the number and placement of the source vessels are possible and have been specifically contemplated by the instant inventors, it should be noted that what is important for purposes of the instant invention is that seismic data be acquired using sources that are firing into the receiver array from at least two different directions, preferably with neither being in-line with the receiver array as would be the case with a conventional towed streamer/source combination (e.g., the prior art configuration of FIG. 3A).

With respect to the location of the sources, it should be noted that although the preferred embodiment utilizes one source positioned at each end of the towed receivers (e.g., the configuration of FIG. 5A) that is not absolutely required. Preferably there will be one source located in the vicinity of the remote end of the receivers (e.g., vessel 370) and another 360 near the receiver vessel 350, but other configurations are certainly possible. Additionally, although the invention has largely been illustrated using examples wherein the sources are located roughly equidistant from the receivers, there is no reason that this must always be the case. In instances where one or more of the sources is situated further away than the other(s) (e.g., FIG. 10C), such differences in positioning can readily be accommodated during processing. In some cases it might be desirable to design a survey wherein the vessels are positioned at different distances from the receivers (e.g., FIG. 10B) to increase the coverage and/or decrease the number of passes that would otherwise be necessary.

Note that for purposes of the instant disclosure that the phrase "proximate to the head of the receiver array" should be understood to mean (in the sense of, e.g., FIG. 7) that the source is positioned near a line which is orthogonal to the streamer array 380 and that passes approximately through the nearest receivers to the vessel 350. Thus, a shooting vessel might be situated at some distance from the receiver array, but still be considered to be proximate to it so long as it (and/or its source) is situated near the proper orthogonal line. In that sense, the vessel 360 in Tile 4 of FIG. 7 will be understood to be "proximate" to the head or start of the receivers 380 even though it might be located several kilometers away. The phrase "proximate to the remote end of the receiver array" has a similar meaning with respect to the source vessel 370, with the orthogonal line being drawn through the most remote set of receivers from the source vessel 350 (e.g., consider once again Tile 4 of FIG. 7). Further, it should be noted that there is no requirement that the orthogonal line discussed previously actually intersect the source vessel or its towed source(s) and it is to be expected that these vessels might be lead or trail the orthogonal line by many hundreds of meters (in the context of the dimensions of the embodiment of FIG. 7) or even more. Finally, a source that is "proximate" to the near or far ends of the receiver array will be further understood to not be in line with those receivers.

Finally, although it is preferred that the source vessels be situated at opposite ends of the receiver array, that is not an absolute requirement. For example, consider the scenario of FIG. 10E, wherein the two sources are located on opposite sides of the receivers and at different distances therefrom. As has been indicated previously, standard seismic processing techniques can be used to combine the data collected from source 1080 with the data obtained from source 1090 to create a wide azimuth seismic dataset.

While the inventive device has been described and illustrated herein by reference to certain preferred embodiments in relation to the drawings attached hereto, various changes and further modifications, apart from those shown or suggested herein, may be made therein by those skilled in the art, without departing from the spirit of the inventive concept, the scope of which is to be determined by the following claims.

What is claimed is:

1. A method of geophysical exploration within a predetermined volume of the earth containing subsurface structural and stratigraphic features conducive to the generation, migration, accumulation, or presence of hydrocarbons, comprising the steps of:
   a. selecting a marine survey area above at least a portion of said predetermined volume of the earth;
   b. positioning a receiver vessel within said survey area, said receiver vessel towing at least one receiver cable behind, said at least one receiver cable having a near end proximate to said receiver vessel and a far end remote therefrom;
   c. positioning a first source vessel within said survey area and proximate to said near end of said at least one receiver cable, said first source vessel having a first seismic source associated therewith, said first seismic source being situated at a first offset with respect to said receiver cable;
   d. positioning a second source vessel within said survey area proximate said far end of said receiver cable, said second source vessel having a second seismic source associated therewith said second seismic source being situated at a second offset with respect to said receiver cable;
   e. activating said first seismic source;
   f. recording via said at least one receiver cable any seismic energy from said first seismic source that is reflected from within said predetermined volume of the earth, thereby creating a first seismic dataset;
   g. activating said second seismic source;
   h. recording via said at least one receiver cable any seismic energy from said second seismic source that is reflected from within said predetermined volume of the earth, thereby creating a second seismic dataset;
   i. storing on a computer readable medium said first seismic dataset and said second seismic data set, thereby creating a first stored dataset;
   j. positioning said first seismic source at a third offset with respect to said receiver cable, said third offset being different from said first offset and from said second offset;
   k. positioning said second seismic source at a fourth offset with respect to said receiver cable, said fourth offset being different from said first offset and from said second offset;
   l. performing steps (e) through (i) again, thereby creating a second stored dataset;
   m. associating together said first and said second stored datasets, thereby creating a composite dataset; and,
   n. using at least a portion of said composite dataset to identify said subsurface features conducive to the generation, migration, accumulation, or presence of hydrocarbons within said predetermined volume of the earth.

2. A method of geophysical exploration according to claim 1, wherein at least steps (c) through (m) are performed a plurality of times, thereby producing a plurality of composite datasets, and wherein step (n) comprises the step of:
   (n1) using any of said plurality of composite datasets to identify said subsurface features conducive to the generation, migration, accumulation, or presence of hydrocarbons within said predetermined volume of the earth.

3. A method of geophysical exploration according to claim 1, wherein step (n) comprises the steps of:
   (n1) reading at least a portion of said composite dataset,
   (n2) processing at least a portion of said read composite dataset to produce an image of at least a portion of the predetermined volume of the earth, and,
   (n3) using said image of at least a portion of the predetermined volume of the earth to identify said subsurface features conducive to the generation, migration, accumulation, or presence of hydrocarbons within said predetermined volume of the earth.

4. A method of geophysical exploration according to claim 1, wherein at least steps (b) through (m) are performed a plurality of times, thereby producing a plurality of composite datasets.

5. A method of geophysical exploration according to claim 1, wherein said at least one receiver cable has a left side and a right side, and wherein said first seismic source and said second seismic source are both positioned on a same side of said at least one receiver cable.

6. A method of geophysical exploration for subsurface resources according to claim 1, wherein said first offset and said second offset are approximately equal and wherein said third offset and said fourth offset are approximately equal.

7. A method of geophysical exploration within a predetermined volume of the earth containing subsurface structural and stratigraphic features conducive to the generation, migration, accumulation, or presence of hydrocarbons, comprising the steps of:
   a. selecting a marine survey area above at least a portion of said predetermined volume of the earth;
   b. towing at least one hydrophone cable within said marine survey area, said at least one hydrophone cable having a leading end and a trailing end;
   c. activating a first seismic source proximate to said leading end of said hydrophone cable;
   d. recording through said at least one hydrophone cable for a predetermined period of time after said first source activation, thereby creating a first seismic data set;
   e. activating a second seismic source proximate to said trailing end of said hydrophone cable;
   f. recording through said at least one hydrophone cable for a predetermined period of time after said second source activation, thereby creating a second seismic dataset;
   g. combining said first and said second seismic datasets to produce a composite seismic dataset that images at least a portion of said predetermined volume of the earth; and,
   h. storing at least a portion of said composite seismic dataset for subsequent use in identifying at least a portion of said subsurface structural and stratigraphic features conducive to the generation, migration, accumulation, or presence of hydrocarbons.

8. A method of geophysical exploration according to claim 7, wherein step (h) comprises the step of:

(h1) storing at least a portion of said composite seismic dataset in a computer readable medium for subsequent use in identifying at least a portion of said subsurface structural and stratigraphic features conducive to the generation, migration, accumulation, or presence of hydrocarbons, wherein said computer readable medium is selected from a group consisting of computer RAM, computer ROM, a PROM chip, flash RAM, a ROM card, a RAM card, a floppy disk, a magnetic disk, a magnetic tape, a magneto-optical disk, an optical disk, a CD-ROM disk, or a DVD disk.

9. A method according to claim 7, comprising the further steps of:
(i) reading at least a portion of said stored composite seismic dataset, and,
(j) using at least said read portion of said stored composite seismic dataset to identify at least a portion of said subsurface structural and stratigraphic features conducive to the generation, migration, accumulation, or presence of hydrocarbons.

10. A method according to claim 7, wherein at least steps (c) through (f) are performed a plurality of times, thereby producing a plurality of first and second seismic datasets, and wherein step (g) comprises the step of:
(g1) combining said plurality of said first and said second seismic datasets to produce a composite dataset that images of at least a portion of said predetermined volume of the earth.

11. A method according to claim 7, wherein said first seismic source and said second seismic source are a same seismic source.

12. A method according to claim 7, further comprising the steps of:
(i) reading at least a portion of said stored composite seismic dataset,
(j) displaying at least a portion of said read stored composite seismic dataset, and,
(k) using at least said read portion of said stored composite seismic dataset to identify at least a portion of said subsurface structural and stratigraphic features conducive to the generation, migration, accumulation, or presence of hydrocarbons.

13. A method of geophysical exploration within a predetermined volume of the earth containing subsurface structural and stratigraphic features conducive to the generation, migration, accumulation, or presence of hydrocarbons, comprising the steps of:
a. selecting a survey area above at least a portion of said predetermined volume of the earth;
b. positioning a recording vessel within said survey area, said recording vessel towing at least one recording streamer therebehind, said at least one recording streamer having a near end proximate to said recording vessel and a far end distant therefrom;
c. positioning a first seismic source boat having a first seismic source proximate to said near end of said at least one recording streamer;
d. positioning a second seismic source boat having a second seismic source proximate to said far end of said at least one recording streamer;
e. moving said recording vessel, said first seismic source and said second seismic source in tandem within said survey area;
f. alternately activating said first seismic source and said second seismic source while recording any seismic signals generated thereby through said at least one recording streamers;
g. combining at least one recording from first seismic source with at least one recording from said second seismic source to produce a composite seismic dataset; and,
h. using at least said composite seismic dataset to detect subsurface structural and stratigraphic features conducive to the generation, migration, accumulation, or presence of hydrocarbons.

14. A method geophysical according to claim 13, wherein step (h) comprises the steps of:
(h1) storing at least one composite seismic dataset in computer readable media,
(h2) reading at least a portion of said stored at least one composite seismic dataset, and,
(h3) using at least said read composite seismic dataset to detect subsurface structural and stratigraphic features conducive to the generation, migration, accumulation, or presence of hydrocarbons.

15. A method of geophysical exploration according to claim 14, wherein said at least one recording streamer has a left side and a right side, and wherein said first seismic source and said second seismic source are both positioned on a same side of said at least one recording streamer.

16. A method of geophysical exploration for subsurface resources, comprising the steps of:
a. selecting a survey area;
b. positioning a recording vessel within said survey area, said recording vessel towing at least one recording streamer therebehind, said at least one recording streamer having a near end proximate to said recording vessel and a far end distant therefrom;
c. positioning a first seismic source proximate to said far end of said at least one recording streamer;
d. positioning a second seismic source distant from said first seismic source;
e. activating said first seismic source;
f. recording through said at least one recording streamer for a predetermined period of time after said first seismic source has been activated, thereby creating a first seismic dataset;
g. activating said second seismic source;
h. recording through said at least one recording streamer for a predetermined period of time after said second seismic source has been activated, thereby creating a second seismic dataset;
i. organizing said first seismic dataset and said second seismic dataset to produce a composite seismic dataset; and,
j. using at least said composite seismic dataset to detect subsurface structural or stratigraphic features conducive to the generation, migration, or occurrence of subsurface resources.

17. A method of geophysical exploration for subsurface resources according to claim 16, wherein step (d) comprises the step of:
(d1) positioning said second seismic source proximate to said near end of said at least one recording streamer.

18. A method of geophysical exploration for subsurface resources according to claim 16, wherein step (j) comprises the steps of:
(j1) storing said composite seismic dataset on a computer readable medium,
(j2) reading at least a portion of said composite seismic dataset from said computer medium,
(j3) applying at least one seismic process to said read composite seismic dataset, thereby producing a processed composite seismic dataset, (j4) displaying at least a portion of said processed composite seismic dataset, and, (j5) using at least said displayed portion of said processed composite seismic dataset to detect subsurface structural or stratigraphic features conducive to the generation, migration, or occurrence of subsurface resources.

* * * * *